(12) United States Patent
Moon et al.

(10) Patent No.: US 7,920,206 B2
(45) Date of Patent: Apr. 5, 2011

(54) CAMERA MODULE PACKAGE

(75) Inventors: Yang Ho Moon, Gyunggi-do (KR); Seung Su Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 442 days.

(21) Appl. No.: 12/230,790

(22) Filed: Sep. 4, 2008

(65) Prior Publication Data

US 2009/0109328 A1 Apr. 30, 2009

(30) Foreign Application Priority Data

Oct. 29, 2007 (KR) ........................ 10-2007-0109041

(51) Int. Cl.
*H04N 5/232* (2006.01)
*H04N 5/225* (2006.01)
*G03B 13/00* (2006.01)
*B32B 27/00* (2006.01)
*B32B 37/24* (2006.01)
*H01L 21/00* (2006.01)

(52) U.S. Cl. .......... 348/374; 348/357; 156/242; 438/65; 438/118

(58) Field of Classification Search ................... 348/294, 348/340, 357, 373–376; 156/64, 108, 145, 156/242, 245; 438/27, 64–65, 69–70, 118–119; 264/261

See application file for complete search history.

(56) References Cited

U.S. PATENT DOCUMENTS

| | | | |
|---|---|---|---|
| 5,256,901 A * | 10/1993 | Ohashi et al. | 257/680 |
| 6,509,636 B1 * | 1/2003 | Tsai et al. | 257/678 |
| 6,590,269 B1 * | 7/2003 | Chuang et al. | 257/432 |
| 2005/0168845 A1 * | 8/2005 | Minamio et al. | 359/819 |

* cited by examiner

*Primary Examiner* — Sinh Tran
*Assistant Examiner* — Daniel M Pasiewicz

(57) ABSTRACT

There is provided a camera module package. A camera module package according to an aspect of the invention includes a bonding unit at an inner surface of a housing including an optical system and a filter adhered to the bonding unit by an adhesive. Here, the bonding unit corresponding to the filter has a longitudinal central region corresponding to a gate and an overflow unit of a runner hardening unit provided when the housing is injection molded, and left and right regions while the longitudinal central region has a smaller surface height than each of the left and right regions, and the adhesive provided between the bonding unit and the filter has a predetermined thickness so that maximum thermal stress generated in the housing has a relatively smaller value than adhesive strength of the adhesive.

6 Claims, 5 Drawing Sheets

CAMERA MODULE PACKAGE

CROSS-REFERENCE TO RELATED APPLICATIONS

This application claims the priority of Korean Patent Application No. 2007-0109041 filed on Oct. 29, 2007 in the Korean Intellectual Property Office, the disclosure of which is incorporated herein by reference.

BACKGROUND OF THE INVENTION

1. Field of the Invention

The present invention relates to a camera module package, and more particularly, to a camera module package that can prevent separation of a filter by strictly controlling the thickness of an adhesive by which the filter is adhered to a housing to reduce thermal stress at a region where the filter is adhered to the housing.

2. Description of the Related Art

In general, the current portable communication terminals, such as a cellular phone, a PDA (personal digital assistant), and a portable PC (personal computer), transmit image data as well as text or voice data and perform image communication.

According to such a trend, a camera module is basically installed at a mobile communication terminal in order to transmit the image data or perform the image communication.

FIG. 1 is a perspective longitudinal view illustrating a general camera module package 1. The camera module package 1 includes a lens barrel 10 having a lens 15 therein. A male thread 11 is formed on the outside of the lens barrel 10, and an incident hole 13 is formed through the center of a top surface of the lens barrel 10.

The lens barrel 10 is threadably engaged with a housing 20 that has a female thread 21 formed around the surface of an inner hole thereof. The housing 20 is provided with an IR-cut filter (hereinafter, referred to as a "filter") 25 along the inner hole of the housing 20. The filter 25 blocks infrared rays included in light that passes through the lens 15.

A substrate 40 having an image sensor 30 mounted thereto is coupled to a lower end of the housing 20. The image sensor 30 has an image region where an image of an object passing trough the lens is formed.

The housing 20 has a protrusion 26 in order to include the filter 25 that removes infrared rays included in light so that the image sensor 30 can react to light like human eyes. The filter 25 is adhered and fixed to the protrusion 26 of the housing 20 by an adhesive 25a that is applied to an outer circumference of the filter 25 that corresponds to the protrusion 26.

However, in order to test durability and reliability of the camera module package 1 in which the filter 25 is adhered and fixed to the protrusion 26 of the housing 20, when a severe test is carried out for 120 hours under high temperature and humidity (humidity of 85% and temperature of 80° C.), the filter 25 is separated from the protrusion 26 of the housing 20.

The cause of the separation of the filter 25 will be described. As shown in FIG. 2, the housing 20 released from an injection mold is provided between a gate 3 and an overflow unit 4 of a runner hardening unit 2. The gate 3 and the overflow unit 4 are connected to longitudinal central regions of both left and right sides of the housing 20, respectively. Resin injected through the runner for injection molding of the housing 20 flows through the gate toward the overflow unit.

In this case, since air traps are formed in the housing 20 that corresponds to the gate 3 and the overflow unit 4, the entire surface height of the protrusion to which the filter is attached is not uniform but longitudinal central regions of individual sides have a larger surface height than both left and right regions thereof. Therefore, the thickness of the adhesive 25a applied to the longitudinal central region of the protrusion 26 becomes relatively smaller. This causes the separation of the filter in a region corresponding to the central region of the protrusion 26 of the housing 20.

Further, the housing 20, the filter 25, and the adhesive 25a have different thermal expansion coefficients from each other. Thermal stress is generated at a high temperature of 80° C. due to a difference in thermal expansion coefficient between the housing and the filter.

FIG. 3 is a distribution chart illustrating a result of thermal stress analysis of a housing, a filter, and an adhesive at a high temperature of 80° C. The adhesive 25a has a maximum thermal stress of 9.5 MPa at the corners thereof that correspond to the corners of the protrusion. When the thermal stress of the adhesive is relatively higher than adhesive strength of the adhesive, the separation of the filter is caused.

SUMMARY OF THE INVENTION

An aspect of the present invention provides a camera module package that can prevent separation of a filter by strictly controlling the thickness of an adhesive by which the filter is adhered to a housing to reduce thermal stress at a region where the filter is adhered to the housing.

An aspect of the present invention also provides a camera module package having a bonding unit at an inner surface of a housing including an optical system and a filter adhered to the bonding unit by an adhesive, wherein the bonding unit corresponding to the filter has a longitudinal central region corresponding to a gate and an overflow unit of a runner hardening unit provided when the housing is injection molded, and left and right regions while the longitudinal central region has a smaller surface height than each of the left and right regions, and the adhesive provided between the bonding unit and the filter has a predetermined thickness so that maximum thermal stress generated in the housing has a relatively smaller value than adhesive strength of the adhesive.

The thickness of the adhesive applied to the longitudinal central region may be larger than that of the adhesive applied to the left and right regions by 5 to 30 μm.

The adhesive has a thickness of 20 μm or more.

The adhesive has a thickness within the range of 19 to 50 μm.

The bonding unit may have an average roughness within the range of 1.4 to 4.0 μm.

The bonding unit may have an average roughness within the range of 2.0 to 2.2 μm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 4:
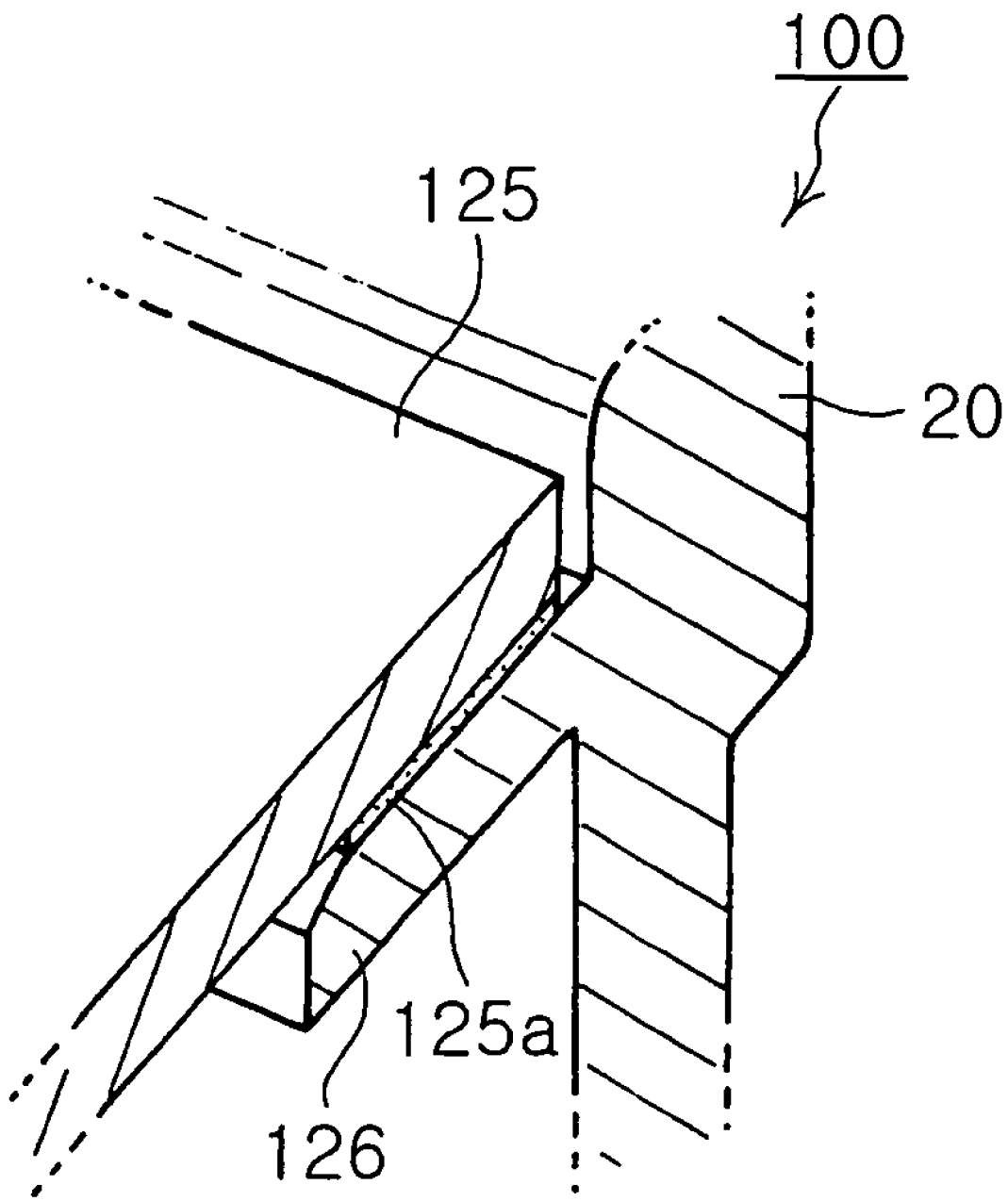
FIG. 4 is a detailed view illustrating a bonding unit of a housing and a filter that are adhered to each other in a camera module package according to an exemplary embodiment of the present invention.

FIG. 4 is a detailed view illustrating a bonding unit of a housing and a filter that are adhered to each other in a camera module package according to an exemplary embodiment of the invention.

A camera module package 100 according to the embodiment of the invention includes a bonding unit 126 that is integrally formed on an inner surface of a housing 20 that has an optical system. The bonding unit 126 is a protruding structure that is integrally formed with the housing when the housing is injection molded. A filter 125 is adhered and fixed to a lower surface of the bonding unit 126 by an adhesive 125a.

The adhesive 125a is applied to the surface of the bonding unit 126 that corresponds to the surface of the filter 125. Here, preferably, the surface of bonding unit 126 is so entirely flat that the adhesive 125a is applied at a uniform thickness. However, during the injection molding of the housing 20, a longitudinal central region C of the bonding unit 126 that corresponds to the gate 3 and the overflow unit 4 of the runner hardening unit 2 has a relatively larger surface height than left and right regions W1 and W2. For this reason, the thickness of the adhesive 125a applied to the longitudinal central region C of the bonding unit 126 is reduced to cause the peeling of the adhesive in a severe test.

Figure 5:
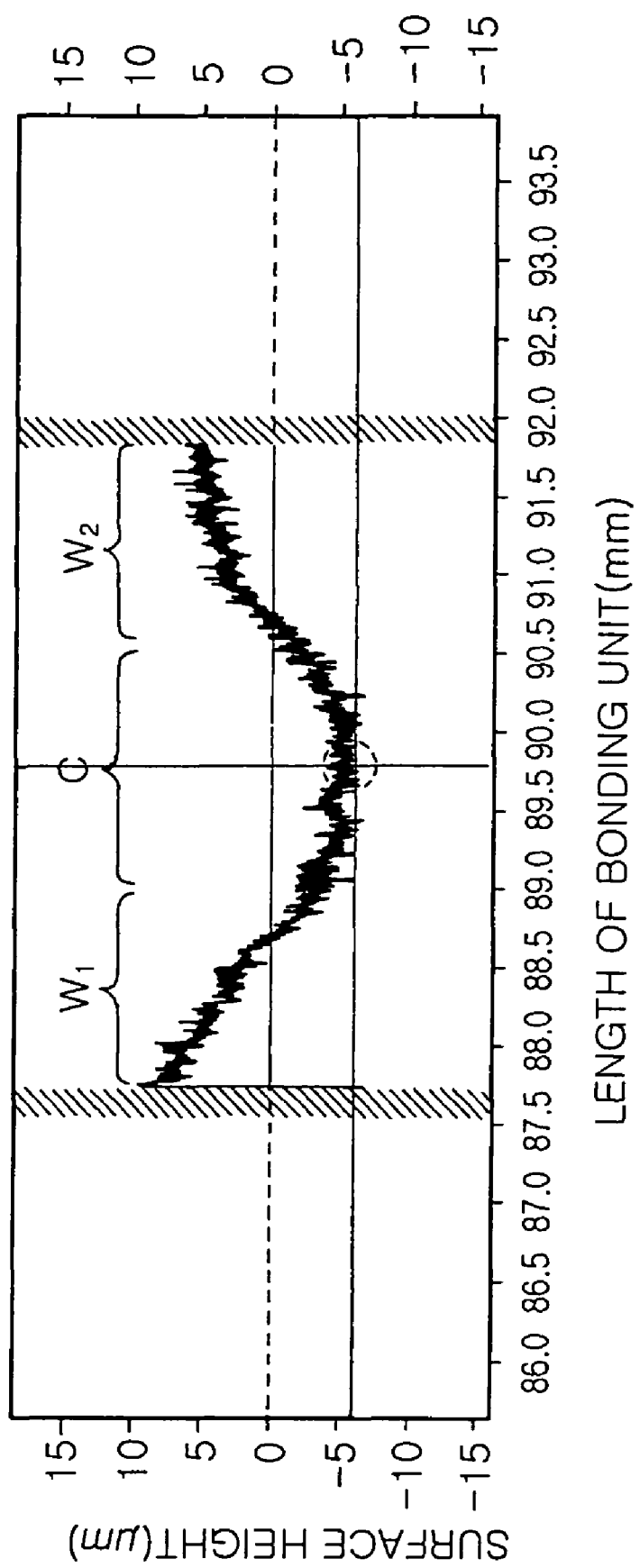
FIG. 5 is a graph illustrating a change in surface height of a bonding unit that is applied to the camera module package according to the embodiment of the present invention.

As shown in FIG. 5, the surface height of the longitudinal central region C that corresponds to the gate 3 and the overflow 4 of the runner hardening unit 2 provided during the injection molding of the housing 20 is reduced to be a relatively smaller than that of each of the left and right regions W1 and W2, such that the thickness of the adhesive 125a applied to the longitudinal central region C of the bonding unit 126, where the peeling of the adhesive occurs, is larger than the thickness of each of the left and right regions W1 and W2. In this way, thermal stress of the adhesive 125a is reduced to thereby prevent the separation of the filter.

At this time, the thickness of the adhesive applied to the longitudinal central region C is larger than the thickness of each of the left and right regions W1 and W2 by 5 to 30 μm or more. Preferably, the longitudinal central region C is twice thicker than the left and right regions W1 and W2.

The adhesive 125a provided between the bonding unit 126 and the filter 125 needs to have a predetermined thickness so that thermal stress generated in the housing is relatively smaller than tensile strength of the adhesive 125a.

TABLE 1

|  | Housing | Adhesive | Filter |
|---|---|---|---|
| Material | Nylon66 | Loctite3103 | Glass |
| Density | 1.39 g/cc | 1.1 g/cc | 7.98 g/cc |
| Modulus of elasticity | 10.5 GPa | 0.207 GPa | 193 GPa |
| Poisson's ratio | 0.3 | 0.3 | 0.3 |
| CTE | 23E-6/° C. | 15E-6/° C. | 7.1E-6/° C. |
| Tensile strength, Ultimate | 110~186 Mpa | 17 Mpa | — |
| Yield tensile strength | 160 Mpa | — | — |

Characteristics of the housing, the filter, and the adhesive are shown in Table 1. Thermal stress is generated at a high temperature of 80° C. due to a difference in coefficient of thermal expansion between the housing and the filter. Since a modulus of elasticity of the adhesive is much smaller than that of each of the housing and the filter, the adhesive 125a serves as a buffer layer between the housing 20 and the filter 125.

Figure 6:
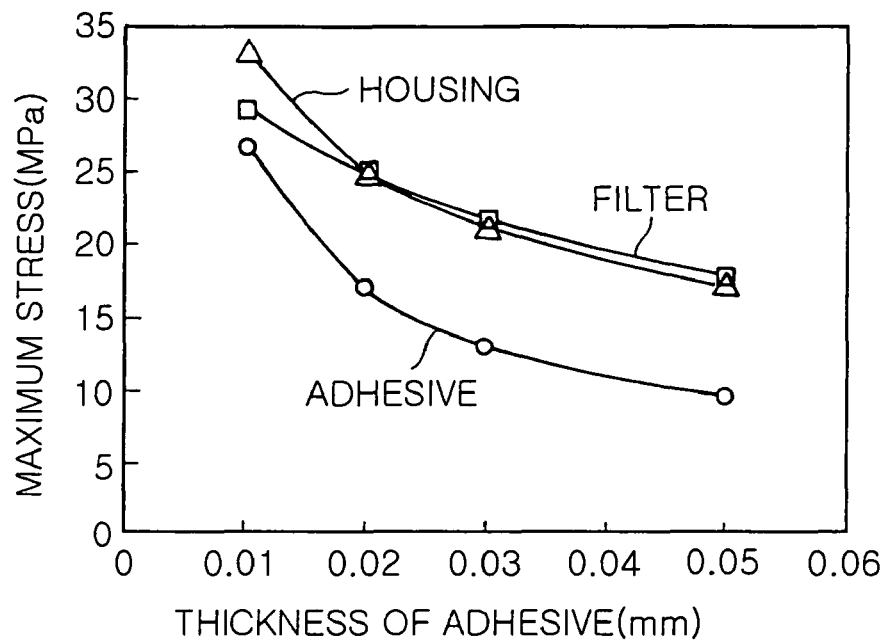
FIG. 6 is a graph illustrating a change in maximum stress generated according to a change in thickness of the adhesive that is applied to the camera module package according to the embodiment of the present invention.

FIG. 6 is a graph illustrating maximum stress of a housing, an adhesive, and a filter according to a change in thickness of the adhesive at the temperature of 80° C. As shown in the graph, when the adhesive 125a provided between the bonding unit 126 and the filter 125 has a small thickness less than 0.02 mm, that is, 20 μm, maximum thermal stress becomes larger than a maximum tensile strength of 17 Mpa of the adhesive.

When the adhesive 125a has a thickness of 20 μm or more, since the thermal stress becomes smaller than the tensile strength of the adhesive, it is possible to prevent separation of the filter adhered to the bonding unit of the housing by the adhesive.

Here, preferably, the adhesive 125a has a predetermined thickness within the range of 19 to 50 μm.

Figure 7:
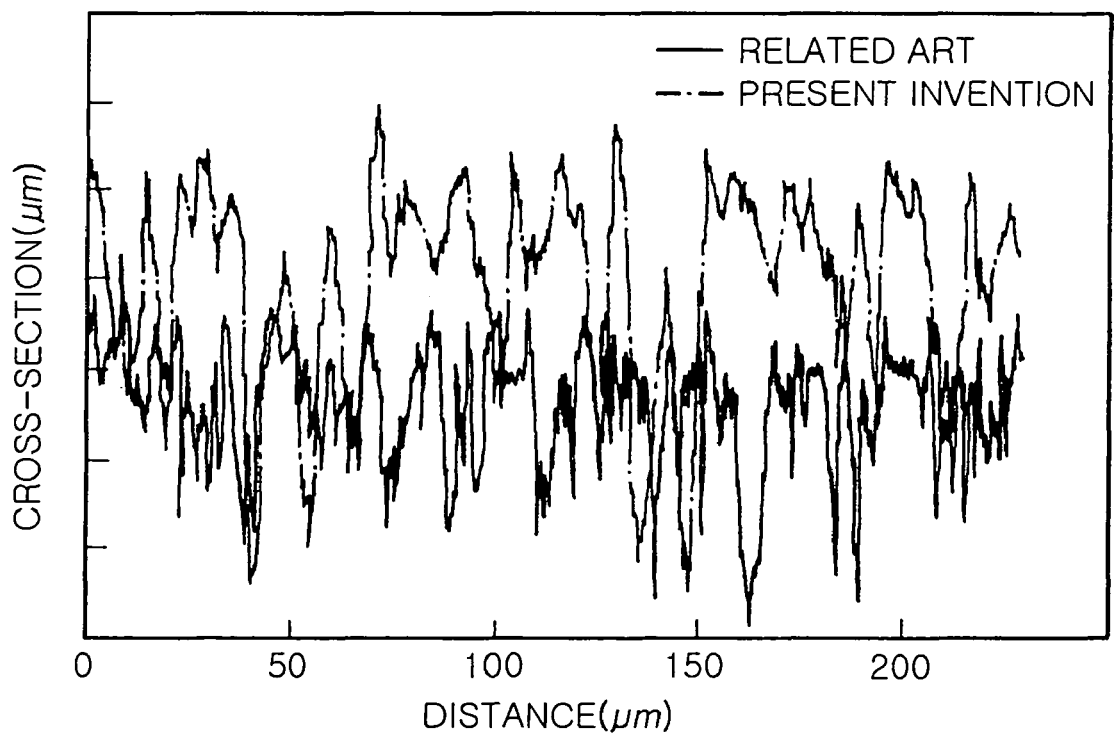
FIG. 7 is a graph illustrating a difference between roughness applied to the bonding unit of the camera module package according to the embodiment of the present invention and roughness applied to a protrusion according to the related art.

FIG. 7 is a graph illustrating a difference between roughness applied to a bonding unit of the camera module package according to the embodiment of the present invention and roughness applied to a protrusion according to the related art. When the protrusion to which the filter is adhered by the adhesive according to the related art has a surface roughness of 1.3 μm, adhesive strength of the adhesive is reduced to cause separation of the filter.

However, when the bonding unit 126 to which the filter 125 is adhered by the adhesive 125a has a roughness within the range of 1.4 to 4.0 μm, the adhesive strength of the adhesive becomes relatively higher than that of the related art, the separation of the filter can be prevented.

When the bonding unit 126 has a roughness within the range of 2.0 to 2.2 μm, the roughness can be easily applied to the surface of the bonding unit, and the adhesive strength of the adhesive can be increased, thereby preventing the separation of the filter.

Figure 1:
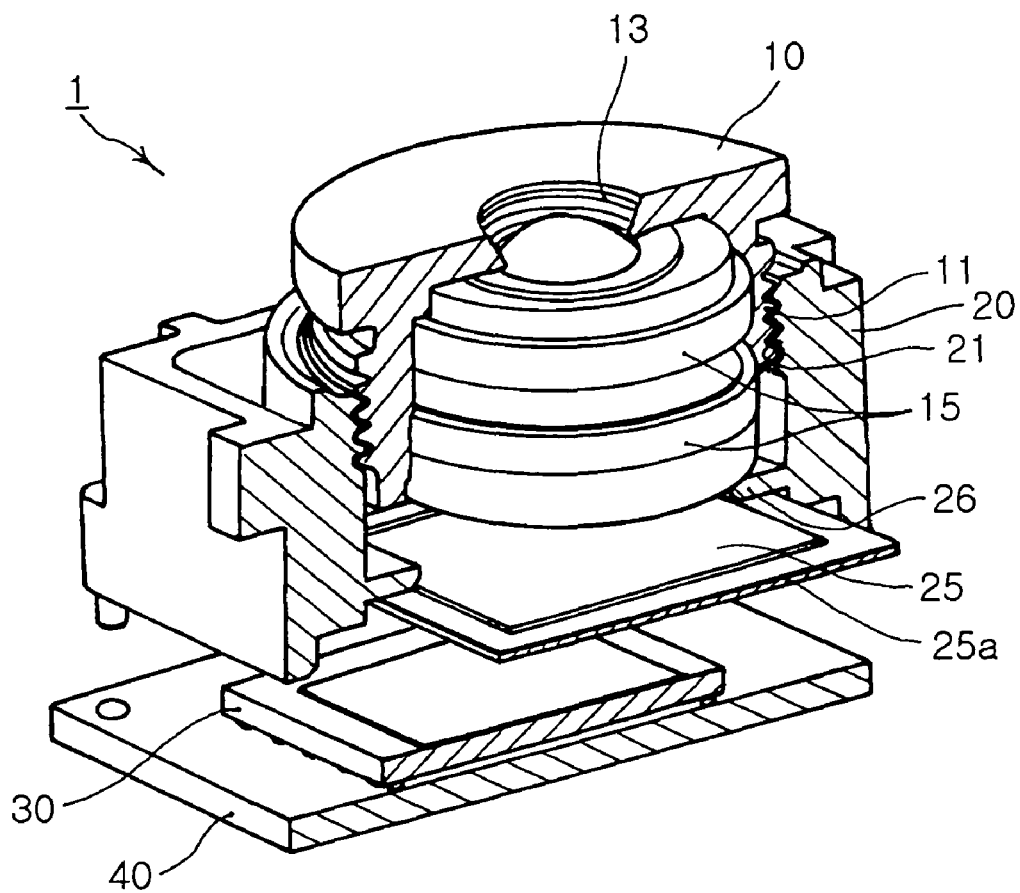
FIG. 1 is a perspective longitudinal view illustrating a general camera module package.
Figure 2:
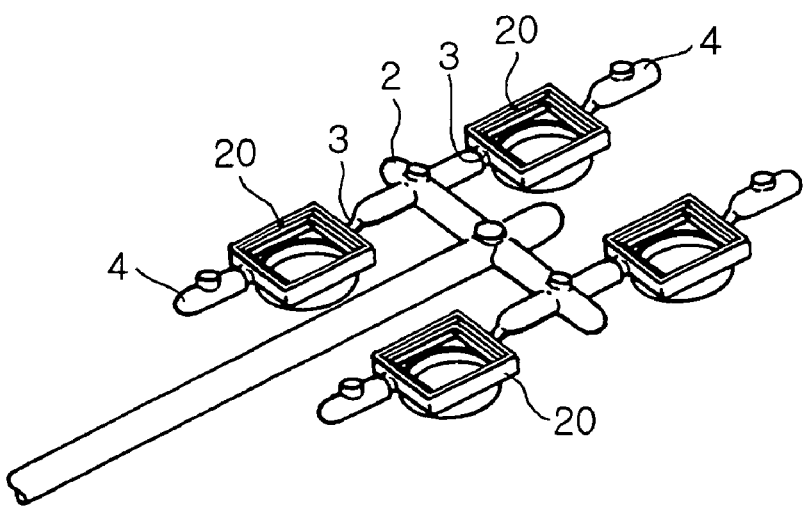
FIG. 2 is a perspective view illustrating a housing provided in an injection molded runner hardening unit.
Figure 3:
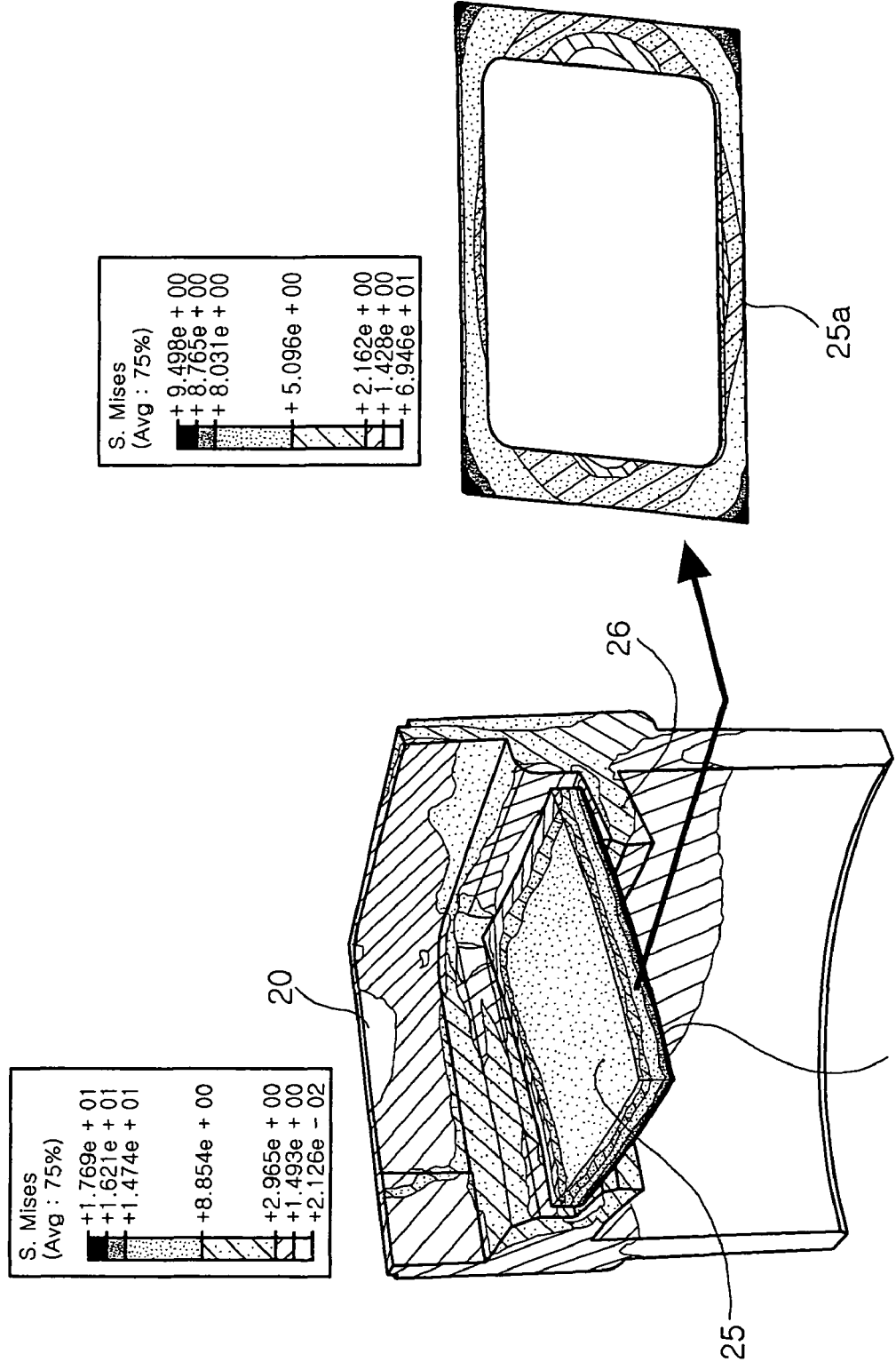
FIG. 3 is a distribution chart illustrating a result of thermal stress analysis of a housing, a filter, and an adhesiveness at a high temperature of 80° C.

As shown in FIG. 1, the optical system that adjusts the focus in an optical axial direction includes the lens barrel 10 having at least one lens 15 therein and the housing 20 threadably engaged with the lens barrel 10. However, the present invention is not limited thereto. An optical system that does not adjust the focus may include at least one lens assembled to the inside of the housing 20.

Further, the image sensor 30 that is disposed at a lower end of the housing is electrically connected to the substrate by flip-chip bonding or wire bonding.

As set forth above, according to exemplary embodiment of the invention, the surface height of the central region of the bonding unit that corresponds to the filter is smaller than that of each of the left and right regions to increase the thickness of the adhesive applied to the central region, such that the thermal stress of the central region where the separation of the filter is likely to occur in a severe test can be reduced to thereby prevent the separation of the filter.

Further, the thickness of the adhesive provided between the bonding unit and the filter is managed so that the maximum thermal stress generated in the housing has a relatively smaller value than the adhesive strength of the adhesive to thereby prevent the separation of the filter.

While the present invention has been shown and described in connection with the exemplary embodiments, it will be apparent to those skilled in the art that modifications and variations can be made without departing from the spirit and scope of the invention as defined by the appended claims.

What is claimed is:

1. A camera module package having a bonding unit at an inner surface of a housing including an optical system and a filter adhered to the bonding unit by an adhesive,
   wherein the bonding unit corresponding to the filter has a longitudinal central region corresponding to a gate and an overflow unit of a runner hardening unit provided when the housing is injection molded, and left and right regions while the longitudinal central region has a smaller surface height than each of the left and right regions, and the adhesive provided between the bonding unit and the filter has a predetermined thickness so that maximum thermal stress generated in the housing has a relatively smaller value than adhesive strength of the adhesive.

2. The camera module package of claim 1, wherein the thickness of the adhesive applied to the longitudinal central region is larger than that of the adhesive applied to the left and right regions by 5 to 30 μm.

3. The camera module package of claim 1, wherein the adhesive has a thickness of 20 μm or more.

4. The camera module package of claim 2, wherein the adhesive has a thickness within the range of 19 to 50 μm.

5. The camera module package of claim 1, wherein the bonding unit has an average roughness within the range of 1.4 to 4.0 μm.

6. The camera module package of claim 5, wherein the bonding unit has an average roughness within the range of 2.0 to 2.2 μm.

* * * * *